United States Patent
Lewis

[15] 3,683,853
[45] Aug. 15, 1972

[54] FISH EGG INCUBATOR

[72] Inventor: Raymond H. Lewis, West Palm Beach, Fla.

[73] Assignee: Oceanography Mariculture Industries, Inc., Riviera Beach, Fla.

[22] Filed: Sept. 17, 1970

[21] Appl. No.: 73,103

[52] U.S. Cl. ................................................119/3
[51] Int. Cl. .............................................A01k 61/00
[58] Field of Search ............119/3, 2, 4, 5; 43/55, 56

[56] References Cited

UNITED STATES PATENTS

| | | | |
|---|---|---|---|
| 3,584,602 | 6/1971 | Sfasio | 119/3 |
| 3,478,463 | 11/1969 | Ruter | 43/55 |
| 2,674,825 | 4/1954 | Rice | 43/56 |
| 180,085 | 7/1876 | Wilmot | 119/3 |
| 680,838 | 8/1901 | Bourgeois | 119/3 |

*Primary Examiner*—Hugh R. Chamblee
*Attorney*—Oblon, Fisher & Spivak

[57] ABSTRACT

A fish egg incubator apparatus is provided which solves the problems of containing the fish eggs while gently circulating water around them for hatching purposes and subsequently transferring the larvae to other containers. The incubator includes a tubular water permeable container connected at each respective end with one of a pair of annular support rings and having a buoyant collar affixed to one of the support rings for floating the container in a body of water with the water permeable wall disposed below the water level therein. A funnel structure and a valve are provided at the bottom of the assembly for alternatively connecting the same to a submersible pump whereby water may be gently pumped into the interior of the tubular container or, upon hatching of the eggs, for closing the valve and slipping a tubular jacket having one closed end over the assembly from the bottom whereby the entire assembly may be lifted from the water and transferred to another area without disturbing the larvae.

6 Claims, 2 Drawing Figures

PATENTED AUG 15 1972 3,683,853

INVENTOR
RAYMOND H. LEWIS

BY Oblon, Fisher & Spivak
ATTORNEYS

FISH EGG INCUBATOR

BACKGROUND OF THE INVENTION

The present invention generally concerns the artificial propagation or raising of food fish and more particularly relates to an improved fish egg incubator device and a novel technique for transferring the larvae, upon hatching thereof, from the incubator to a separate rearing tank or other body of water.

In the art of incubating fish eggs, fish egg holder trays are presently known which are designed to be stacked one above another for permitting a continuous water flow to cascade successively downward therethrough to keep the eggs therein immersed in water and provide a uniform circulation of water over the eggs, and which further are provided with flotation cells for permitting the same tray to be removed from the stack and floated in a rearing pond or other body of water. Heretofore, however, the devices have generally included both perforate top and bottoms for permitting free ingress and egress of water over all areas therein, and the relative buoyancy imparted by the flotation means has generally been such that the tray floats with its major portion submerged so that the entire contents of the tray are immersed.

Until recently, the artificial propagation and raising of fish has generally concerned only the various species of fresh water fish and these fish egg incubating devices accordingly have been designed primarily to accommodate the characteristics of fresh water fish, with little, if any, consideration being given to design characteristics which might be more beneficial in the propagation of salt water, estuarine, or marine fish, as they may more broadly be classified. An ever-increasing demand, however, for greater supplies of food fishes and the healthful protein which comes therefrom has now caused this industry to extend its practice to include the marine varieties. Thus, in contrast to certain species of fish which live and/or breed in fresh water, such as, for example, trout and salmon, and produce demersal eggs, which are negatively buoyant and sink to the bottom of the fresh spawning waters, many species of marine fish, such as, for example, the highly flavorful pompano, produce eggs which are buoyant, so that they float near the surface. This is the case because the larva of the pompano, as well as many other species of marine fish, is a pelagic plankton feeder, whereby it is essential for its survival that it be hatched in the proper feeding environment near the surface.

It has been found, in pompano mariculture and the like, since the incubation tank must provide a closely controlled environment favorable for embryo development, including careful control of light, temperature and salinity, that a special tank should be used for this incubation stage and, upon hatching, the larvae may be transferred to another tank which is intended to optimize the larvae rearing conditions. This phase is perhaps the most critical in the production process, however, since once the eggs have hatched, the larvae, which are quite small and delicate, are quite vulnerable, so that great care must be exercised in transferring them.

The problems encountered with hatching buoyant eggs which float on the surface of the incubator tank and subsequently transferring the larvae safely to another, or rearing tank, are not satisfactorily dealt with by presently known incubator devices and fish "farming" techniques.

SUMMARY OF THE INVENTION

Accordingly, the present invention is broadly directed to improvements in the form and construction of fish egg incubators to overcome certain difficulties and shortcomings of existing incubators which limit the benefits obtainable therefrom, especially in the propagation and raising of certain marine fish.

Thus, it is an object of the present invention to provide an improved fish egg incubator wherein the fish eggs are gently circulated with water and from which the resulting larvae may be easily and gently transferred to other containers.

Another object of the present invention is to provide an improved apparatus for hatching the eggs of certain marine fish and transferring the same safely to other containers.

The foregoing and other objects are achieved, according to one aspect of the present invention, by a specially designed incubator for confining an egg batch which consists of a hollow tube of water permeable material fastened at one end to the wide end of a funnel structure and provided with a flotation collar of a buoyant material, such that the incubator floats upright in an incubation tank, with the open upper end of the tube just above the water surface and the funnel outlet toward the bottom of the tank. For circulation, a submersible pump in the tank delivers water through a tube connected to the funnel bottom and upward into the floating incubator, through the walls of which the water freely circulates back into the tank. A valve in the funnel bottom permits closing of the same whereupon, when the pump tubing is removed, a tubular jacket having a closed end may be slipped over the incubator from the bottom whereby the entire assembly may be lifted from the tank, with the incubator container still submerged in water within the confines of the jacket, and transferred to a separate rearing tank or other body of water without disturbing the hatched eggs or larvae therein.

BRIEF DESCRIPTION OF THE DRAWING

Various other objects, features and attendant advantages of the present invention will be more readily appreciated as the same becomes better understood from the following detailed description when considered in connection with the accompanying drawing wherein.

DESCRIPTION OF A PREFERRED EMBODIMENT

Figure 1:
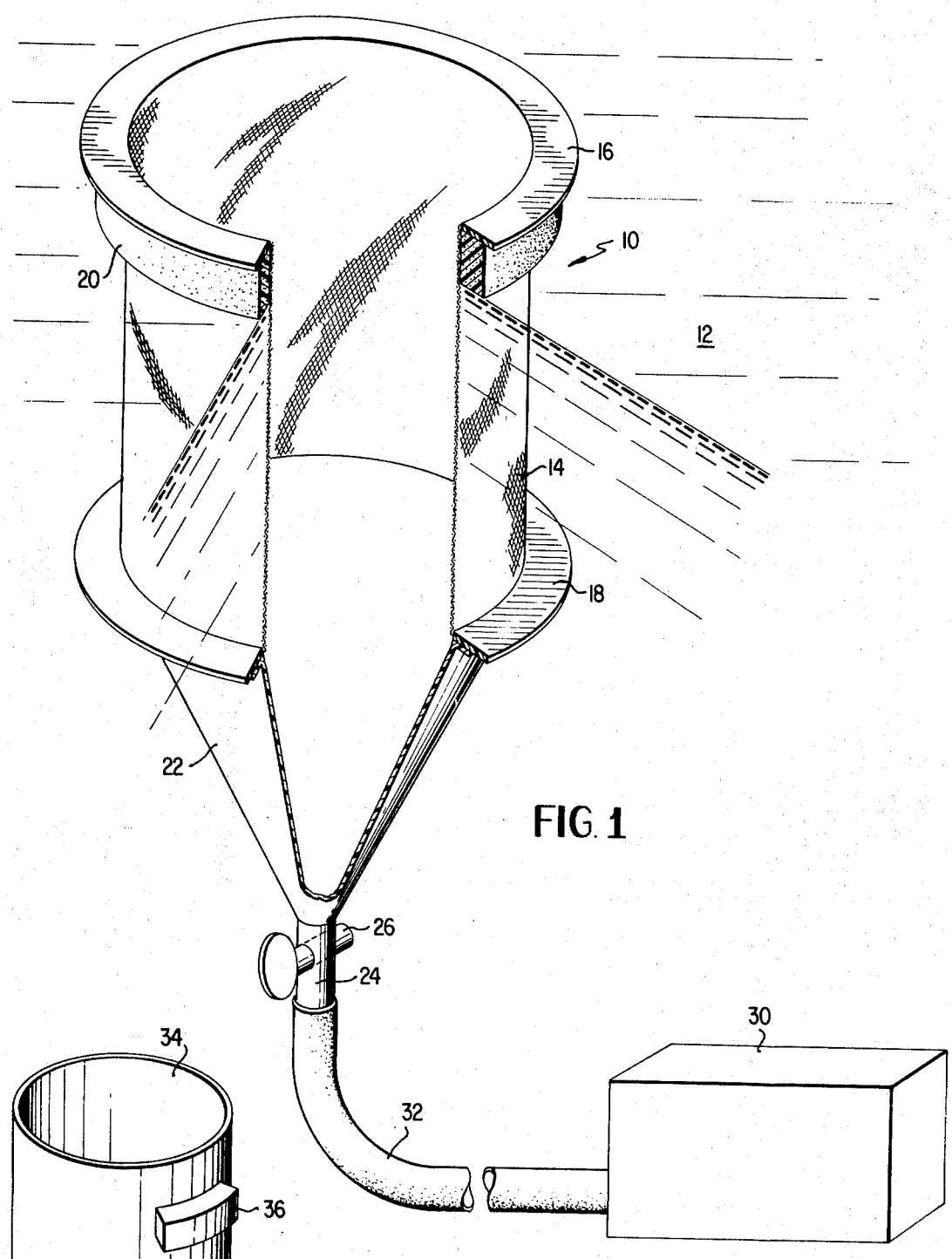
FIG. 1 is a generally perspective view, in schematic form, being shown partly in section, of a preferred embodiment of a fish egg incubator afloat in a body of water and shown being attached to a pump for circulating water therethrough.
Figure 2:
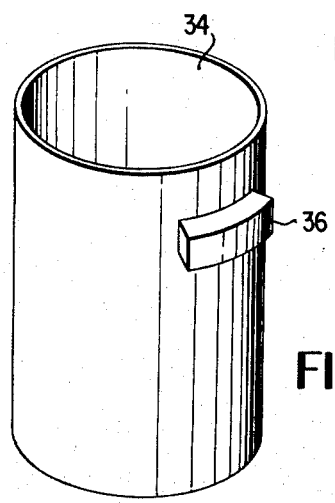
FIG. 2 is a perspective view of the jacket which may be used in combination with the fish egg incubator, upon disconnecting the same from the pump, for transferring the incubator to another body of water without disturbing the contents thereof.

Referring now in particular to FIG. 1 of the drawing, a fish egg incubator generally indicated by the reference numeral 10, for containing fertilized eggs and keeping the same in a given locality while providing gentle circulation of water about them, is shown afloat in a body of water 12. The incubator 10 comprises a hollow, preferably tubular, container 14 of water permeable material, such as, for example, a fine nylon mesh screen, which is supported by flat annular rings 16 and 18 secured to the ends thereof. The rings 16 and 18 may be constructed from any suitable material, such as, for example, polyvinylchloride.

A flotation collar 20 of a suitable buoyant material, such as, for example, foamed polystyrene, is secured to the underside of the flat annular ring 16 by a suitable marine adhesive, or the like, such that the incubator floats upright in the water with the open end of the tubular piece 14 to which ring 16 is affixed being just above the water level. The bottom of the incubator 10 is preferably formed in a substantially funnel-like configuration and, as shown, consists of a separate member 22 having the wide mouth end thereof attached to the lower ring 18 by a marine adhesive, or any other satisfactory manner. The lower end of the funnel-like member 22 terminates in a substantially tubular projection 24 which is integrally formed therewith and provides a fluid communication path to the bottom of the incubator 10, or the funnel portion 22 thereof. Disposed within the tubular projection 24 is a valve member 26 which is operable for either opening or closing the fluid communication path through the projection 24. Although it is understood that other materials may be used, the funnel-like structure 22, tubular projection 24 and the valve 26 are preferably formed from polyethylene.

A submersible bilge pump 30 is positioned in the body of water 12 and is connected through a length of tygon tubing 32, or similar conduit means, to the downwardly extending projection 24 of the funnel member 22. In use, therefore, during the normal incubation period, the egg incubator 10 floats in the water 12 at the level of the flotation collar 20, and the viable eggs inserted into the interior thereof float on the water in the incubator, which is continuously being exchanged with the exterior water through the tubular nylon mesh screen wall 14. For insuring that a relatively gentle circulation is maintained, the valve 26 is placed in an "open" position, whereby water may be gently pumped into the interior of the incubator 10 by the submersible pump 30 attached thereto through the tubing 32.

Other configurations can obviously be developed for satisfying the requirements of the incubation stage. For example, for water circulation purposes, the incubation tank, or body of water 12, may be provided with a manifold reservoir at some height above the water level in the tank and this manifold may be provided with one or more valved outlet pipes each of which can be connected by tubing to the submerged funnel outlet 24 of an incubator 10. A submersible pump, such as, for example, the pump 30, in the body of water 12 may be utilized for delivering water to the mainfold, from which it can be distributed by gravity feed via the tubing to the incubator or incubators. This alternative arrangement also provides a relatively gentle circulation mechanism within the incubators while allowing for adequate overall circulation rates. The main thing is that the eggs be exposed to a relatively gentle circulation pattern which produces some stirring or motion.

Toward the end of the incubation period, when the eggs are ready to hatch, they are preferably transferred to another tank which is environmentally controlled to optimize the larvae survival rate. As indicated hereinbefore, this phase is the most critical in the production process, since once the eggs have hatched, the larvae, which are quite small and delicate, are quite vulnerable, so that great care must be exercised in transferring them.

Referring now in particular to FIG. 3, there is shown a cylindrical jacket 34 constructed of a suitable material, preferably polyvinylchloride, which is closed at one end and open at the other end and is provided with handles 36, only one of which is shown. The purpose of this jacket is to assist in transferring the larvae from the incubation tank to a rearing tank, or the like, as will be set forth hereinbelow.

The transfer of the larvae is accomplished first by turning off the pump 30 and closing the valve 26 in the tubular projection 24 of the incubator 10. The tygon hose, or tubing, 32 is then removed from the projection 24 and the jacket 34 is slipped over the incubator 10 from the bottom thereof, beneath the surface of the water, and the entire assembly is lifted from the water by means of the handles 36. Thus, during transfer, the incubator is positioned within the jacket 34 with substantially the same level of water in and surrounding it as when it was floating in the body of water 12, whereby the larvae remain undisturbed therein. Removal of the larvae from the assembly including the incubator 10 and the jacket 34 is accomplished by pushing the entire structure downward into the water whereupon, at the time the flotation collar 20 becomes substantially level with the surface of the water therein, the incubator 10 may be left floating in the new body of water merely by continuing to push the jacket 34 alone further downwardly to thereby free the incubator 10 from the jacket 34. In this case, the larvae are transferred to a new tank still being contained within the protective confines of the incubator screening 14. On the other hand, if it is desired to transfer the larvae to the new container and free the same from the incubator, it is only necessary to press the flotation collar 20 downwardly beneath the surface of the water of the new container to permit the larvae therein to float to the surface and outside the cylindrical chamber of the incubator.

Of course, the transfer could be accomplished in a single step by pressing both the cylindrical jacket 34 and the incubator 10 simultaneously downward below the surface of the water of the new tank.

Obviously many modifications and variations of the present invention are possible in light of the above teachings. It is to be understood, therefore, that within the scope of the appended claims the present invention may be practiced otherwise than as specifically described herein.

What is claimed and desired to be secured by letters patent is:

1. A fish egg incubator apparatus comprising, in combination:

a substantially tubular container having a water-permeable wall portion and a closed bottom portion, an inlet port in said bottom portion, valve means in said inlet port for selectively opening or closing the same, a buoyant collar secured to said container for floating said container in a body of water with said water permeable wall portion and said closed bottom portion thereof being submerged in said body of water and the open top of said container being just above the surface of said body of water, a submersible pump, and, a fluid conducting conduit connected at one end of said pump and disengageably connected at the other end with said inlet port.

2. The apparatus set forth in claim 1, wherein said buoyant collar is constructed of foamed polystyrene.

3. The apparatus set forth in claim 1, wherein said water permeable wall of said container includes a fine nylon mesh screen forming at least part of the tubular wall surface thereof.

4. In combination with a fish egg incubator which includes a container having a water permeable wall portion, a closed wall portion, an open end, an inlet port in said closed wall portion, valve means for selectively opening or closing said inlet port, and a buoyant member for floating said container in a body of water with only said open end thereof being above the water surface in said body of water and the remaining portion being submerged, a jacket having one open end for receiving said container when the same is slipped over said container from the lower submerged end thereof, said jacket having handles for facilitating the manual grasping thereof.

5. The apparatus set forth in claim 4, wherein said container is substantially tubular in configuration and said jacket is a hollow cylindrical member being open at one end and closed at the other end.

6. A fish egg incubator apparatus comprising, in combination:

a container having an upper water permeable wall portion being substantially tubular in configuration, a substantially funnel-shaped closed wall portion being axially aligned with said tubular water permeable wall portion and being open at the wide mouth end thereof into said tubular wall portion, and an inlet port at the narrow mouth end of said funnel-shaped closed wall portion, valve means in said inlet port for selectively opening and closing the same, means for floating said container in a body of water in a substantially vertically oriented position with a predetermined portion thereof being submerged in said body of water, a pump, and fluid communication means between said pump and said inlet port in the bottom of said container for selectively circulating water from said body of water through said closed wall portion of said container and thereinto, whereby a continuous exchange of water in the container is provided by permitting the water therein to permeate through said water permeable wall portion for return to said body of water.

* * * * *